Aug. 30, 1955     W. E. PARISH     2,716,740
EXPLOSION PROOF CORD CONNECTOR
Filed Aug. 1, 1951
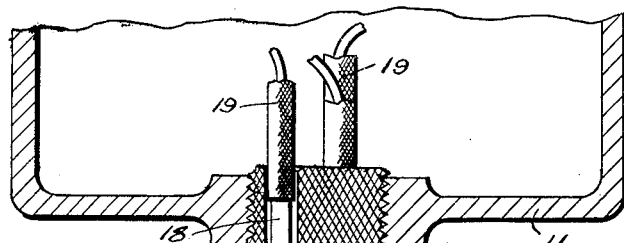
Fig. 1
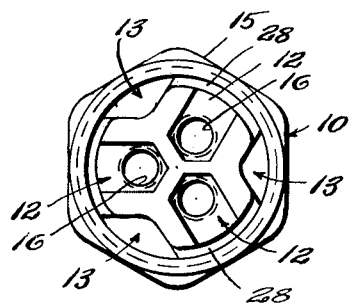
Fig. 2
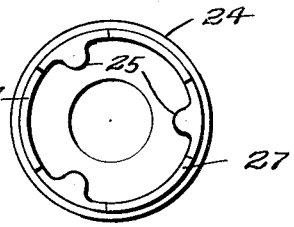
Fig. 3
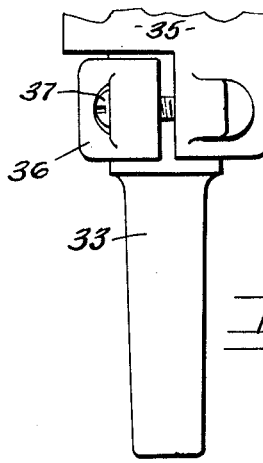
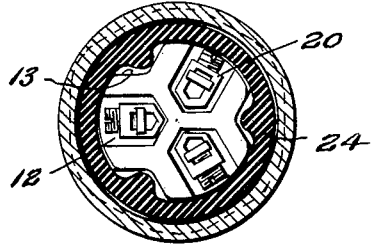
Fig. 4
Fig. 5
INVENTOR.
Willard E. Parish
BY
Bodell + Thompson
ATTORNEYS.

United States Patent Office 2,716,740
Patented Aug. 30, 1955

2,716,740
EXPLOSION-PROOF CORD CONNECTOR

Willard E. Parish, Syracuse, N. Y., assignor to Crouse-Hinds Company, Syracuse, N. Y., a corporation of New York Application August 1, 1951, Serial No. 239,769

2 Claims. (Cl. 339—89)

This invention relates to an electrical cord connector, and more particularly to a cord connector embodying a structure by which the conductors of the cord may be connected to the feed wires of an enclosed explosion proof conduit installation.

The invention has as an object a cord connector of the type referred to embodying a structure by which the conductors of the cord can be conveniently connected to the power service enclosed in an explosion-proof conduit system, the cord being fixedly connected to the system whereby it can not be accidentally disconnected, and the connector embodying a flameproof barrier between the cord and the conductors in the conduit system.

The invention consists in the novel features and in the combinations and constructions hereinafter set forth and claimed.

In describing this invention, reference is had to the accompanying drawings in which like characters designate corresponding parts in all the views.

Figure 1 is a vertical sectional view of a cord connector embodying my invention and including a contiguous portion of a housing or outlet box of the conduit system.

Figure 2 is an end view of the body member of the connector.

Figure 3 is an end view of the insulating shell.

Figure 4 is a sectional view taken on line 4—4, Figure 1.

Figure 5 is a side elevational view of the outer end portion of the connector.

The cord connector includes a body 10 formed of insulating material. One end of the body is of reduced diameter and threaded externally for threaded engagement with a housing 11 which may be in the form of a conduit outlet box forming part of an enclosed explosion-proof conduit system. The outer end portion of the body is of reduced diameter and is formed with a plurality of recesses 12, 13. The intermediate portion of the body is threaded externally, as at 14, and that part between the threaded portions may be of hexagonal or non-circular formation, as indicated at 15, to aid in threading the body into the housing 11.

The body is formed with a plurality of apertures 16 extending in an axial direction through the body, these apertures being arranged in registration with the recesses 12. A current carrying member 18 is positioned in each of the apertures 16 and is mounted therein in flametight relation to the body. The feed conductors 19 of the conduit system are attached to the inner ends of the current carrying members 18, and these members have affixed to their outer ends terminal members 20 which are positioned in the recesses 12 and which serve to connect the conductors 21 of the cord 22 to the current carrying members.

The outer end portion of the body and the terminal members 20 are encircled by a shell 24 formed of insulating material. This shell is formed on its inner surface with axially extending ribs 25 which are adapted to be positioned in the recesses 13 formed in the outer end of the body. The shell 24 is also formed with axially extending arcuate projections 27 adapted to be positioned in arcuate extending slots 28 formed in the confronting surface of the body. The projections 25, 27 cooperate to restrain rotation of the shell 24 relative to the body 10.

The outer end of the shell is provided with a conical bore 30 to receive the conical surface 31 of an enlarged head portion 32 of a cord grip sleeve 33.

The connector is completed by an outer shell 35 threaded internally at one end for engagement with the threaded portion 14 of the body. The outer end of the shell 35 is apertured to receive the cord grip sleeve 33 and engages the enlarged head portion 32 thereof, whereby when the shell 35 is threaded onto the body, the cord grip 33 is urged against the outer end of the shell 24 and the shell 24 is urged against the body. The outer shell 35 is provided with a clamp member 36 which, in conjunction with screws 37 threading into apertures 38, forms a clamp for the outer portion of the cord grip sleeve 33.

With this arrangement, the conductors 21 of the cord are conveniently attached to the current carrying members by the terminals 20, the shell 24 positioned to encircle the terminals, and the assembly is completed by threading the outer shell 35 on the body fixedly securing the cord against accidental displacement and effecting a flametight arrangement between the cord and the conduit system.

What I claim is:

1. An explosion-proof cord connector comprising a cylindrical body formed of insulating material and being threaded externally at one end for flametight engagement with a housing, the outer end of said body being formed with a plurality of axially extending recesses, a current carrying member arranged in register with each of said recesses and extending through the body in flametight relation thereto, a terminal member positioned in each of said recesses, said terminal members being attached to the outer ends of said current carrying members respectively, a second series of axially extending recesses formed in the body intermediate said first mentioned recesses an insulating shell encircling the outer end of said body and being formed with axially extending ribs on its inner surface positioned in the recesses of said second series, a cord grip sleeve engaging the outer end of said shell, an outer shell encircling said insulating shell and being threaded on the body intermediate the ends thereof, said outer shell being operable upon threaded engagement with the body to move said cord grip sleeve against said insulating shell and to move the latter against the body.

2. An explosion-proof cord connector comprising a cylindrical body formed of insulating material and being threaded externally at one end for flametight engagement with a housing, the opposite end of said body being formed with a plurality of recesses, a plurality of current carrying members extending through the body in flametight relation thereto, a terminal member arranged in each of said recesses, said terminal members being attached to said current carrying members respectively, an insulating shell encircling the outer end of the body and said terminal members, a cord grip sleeve engaging the outer end of said insulating shell, an outer cylindrical shell having threaded engagement with the body intermediate the ends thereof and being operable to move said cord grip sleeve into engagement with the outer end of said insulating shell and to move said shell against the body, the abutting surfaces of said insulating shell and body having projections and recesses cooperable to restrain rotation of said insulating shell relative to the body.

References Cited in the file of this patent

UNITED STATES PATENTS

| 2,281,654 | Wulle et al. | May 5, 1942 |
| 2,331,409 | Markey | Oct. 12, 1943 |
| 2,424,067 | Thoren | July 15, 1947 |
| 2,454,838 | Richardson et al. | Nov. 30, 1948 |

FOREIGN PATENTS

| 17,480 | Great Britain | Sept. 7, 1916 |
| 511,509 | Great Britain | Aug. 21, 1939 |